United States Patent
Dominguez

(10) Patent No.: US 11,537,567 B2
(45) Date of Patent: Dec. 27, 2022

(54) METHODS AND SYSTEMS FOR MANAGING PRIORITIZED DATABASE TRANSACTIONS

(71) Applicant: Huawei Technologies Co., Ltd., Shenzhen (CN)

(72) Inventor: David Dominguez, Munich (DE)

(73) Assignee: Huawei Technologies Co., Ltd., Shenzhen (CN)

(\*) Notice: Subject to any disclaimer, the term of this patent is extended or adjusted under 35 U.S.C. 154(b) by 145 days.

(21) Appl. No.: 16/708,052

(22) Filed: Dec. 9, 2019

(65) Prior Publication Data
US 2020/0110730 A1 Apr. 9, 2020

Related U.S. Application Data

(63) Continuation of application No. PCT/EP2017/064151, filed on Jun. 9, 2017.

(51) Int. Cl.
| | |
|---|---|
| G06F 9/00 | (2006.01) |
| G06F 16/18 | (2019.01) |
| G06F 16/182 | (2019.01) |
| G06F 16/176 | (2019.01) |
| G06F 9/46 | (2006.01) |
| G06F 9/54 | (2006.01) |

(52) U.S. Cl.
CPC ...... *G06F 16/1865* (2019.01); *G06F 9/466* (2013.01); *G06F 9/544* (2013.01); *G06F 16/1774* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 4,698,752 A | 10/1987 | Goldstein et al. | |
| 6,161,208 A * | 12/2000 | Dutton | G06F 11/1008 |
| | | | 711/118 |

(Continued)

FOREIGN PATENT DOCUMENTS

| | | |
|---|---|---|
| CN | 1975675 A | 6/2007 |
| CN | 104252545 A | 12/2014 |
| CN | 104850631 A | 8/2015 |
| JP | H03235130 A | 10/1991 |

OTHER PUBLICATIONS

Chen et al., "A priority scheduling for TM pathologies," The Journal of Supercomputing, vol. 71, pp. 1095-1115, XP035460337A, Springer Science+Business Media, New York (Dec. 23, 2014).

(Continued)

*Primary Examiner* — Tuankhanh D Phan
(74) *Attorney, Agent, or Firm* — Leydig, Voit & Mayer, Ltd.

(57) ABSTRACT

A database management system for controlling prioritized transactions, comprising: a processor adapted to: receive from a client module a request to write into a database item as part of a high-priority transaction; check a lock status and an injection status of the database item; when the lock status of the database item includes a lock owned by a low-priority transaction and the injection status is not-injected status: change the injection status of the database item to injected status; copy current content of the database item to an undo buffer of the low-priority transaction; and write into a storage engine of the database item.

16 Claims, 5 Drawing Sheets

(56) References Cited

U.S. PATENT DOCUMENTS

| | | | |
|---|---|---|---|
| 9,160,539 B1* | 10/2015 | Juels | G06F 21/554 |
| 9,507,717 B1 | 11/2016 | Busaba et al. | |
| 9,524,188 B1 | 12/2016 | Busaba et al. | |
| 2007/0288526 A1 | 12/2007 | Mankad et al. | |
| 2011/0099313 A1* | 4/2011 | Bolanowski | G06F 9/4837 |
| | | | 710/262 |
| 2012/0089735 A1* | 4/2012 | Attaluri | G06F 9/5038 |
| | | | 709/226 |

OTHER PUBLICATIONS

Yan et al., "A Case Study of the Interplay between Conflict Management and Version Management in Hardware Transactional Memory Systems," 2011 Fourth International Symposium on Parallel Architectures, Algorithms and Programming, XP032094143A, pp. 334-339, IEEE Computer Society (Dec. 2011).

Bernstein et al., "Principles of Transaction Processing," 2nd Edition, pp. 1-380, Publisher: Morgan Kaufmann, Elsevier (Jul. 2009).

Yu et al., "Staring into the Abyss: An Evaluation of Concurrency Control with One Thousand Cores," Proceedings of VLDB Endowment, vol. 8, No. 3, pp. 209-220 (2014).

Jun et al., "Multi-Version Two-Phase Locking Concurrency Control Protocol Based on Priority," Journal of South-Central University for Nationalities (Nat. Sci. Edition), vol. 33 No. 1, total 3 pages (Mar. 2014). With an English abstract.

Kuo et al., "Two-Version Based Concurrency Control and Recovery in Real-Time Client/Server Databases," IEEE Transactions on Computers, vol. 52, No. 4, pp. 506-524 (Apr. 2003).

CN/201780091822.7, Notice of Allowance/Search Report, dated Sep. 20, 2022.

* cited by examiner

METHODS AND SYSTEMS FOR MANAGING PRIORITIZED DATABASE TRANSACTIONS

CROSS-REFERENCE TO RELATED APPLICATIONS

This application is a continuation of International Application No. PCT/EP2017/064151, filed on Jun. 9, 2017, the disclosure of which is hereby incorporated by reference in its entirety.

FIELD

The present disclosure, in some embodiments thereof, relates to prioritizing database transactions and, more particularly, but not exclusively, to simultaneously executing conflicting transactions by managing lock status.

BACKGROUND

Database systems process units of computation that are called transactions. A transaction has a set of properties that are summarized with the acronym ACID:

(A) Atomicity: all transaction changes are applied as a whole, or none of them are applied.

(C) Consistency: if the database fulfills all integrity constraints before the transaction, the database still fulfills the constraints afterwards.

(I) Isolation: the result of a concurrent execution of multiple transactions is equivalent to one serial execution of all concurrent transactions. The ANSI/ISO SQL standard defines different degrees of isolation. With this disclosure, we target the highest possible isolation level, which is called "serializable".

(D) Durability: the transaction changes survive system failures.

In order to support ACID properties, current database systems are implemented with concurrency control techniques that guarantee these properties. There are two broad families of concurrency control techniques for databases: lock based and timestamp ordering based.

In some cases, a transaction might be associated to a high priority configuration. High priority transactions are atomic and are required to have better quality of service than the rest of the transactions.

Lock based approaches set a lock on each item modified. The lock may be issued as a shared lock when the transaction reads the object; or an exclusive lock when the transaction writes the object. One transaction may obtain a shared lock on an item if the item is not locked by other transaction, or if other transaction holds a shared lock. One transaction can obtain an exclusive lock on an item if the item is not locked by another transaction. This prevents two simultaneous transactions modifying the object concurrently. Lock based techniques use the two phase locking protocol: one transaction gets the corresponding locks before accessing the object, and releases all of them when the transaction commits or aborts.

If one transaction A holds the lock and transaction B requests it, there are several techniques to handle this situation that are used in existing systems:

WAIT: transaction B waits until transaction A releases the lock.

NO WAIT: transaction B aborts when it requests a lock hold by another transaction.

WAIT-IF: transaction B waits if some condition is met, otherwise it aborts. Typical conditions are: B is younger than A (WAIT-DIE) or B is older than A (WAIT-WOUND).

SUMMARY

According to a first aspect of the present disclosure, there is provided a database management system for controlling prioritized transactions, including: a processor adapted to: receive from a client module a request to write into a database item as part of a high-priority transaction; check a lock status and an injection status of the database item; when the lock status of the database item includes a lock owned by a low-priority transaction and the injection status is not-injected status: change the injection status of the database item to injected status; copy current content of the database item to an undo buffer of the low-priority transaction; and write into a storage engine of the database item.

This allows a high-priority transaction to be executed even when a lock exists on the item by a low-priority transaction. Both transactions may execute, while the low-priority transaction does not wait or is aborted.

According to a second aspect of the present disclosure, there is provided a computer implemented method of controlling prioritized transactions in a database management system, including: receiving from a client module a request to write into a database item as part of a high-priority transaction; checking a lock status and an injection status of the database item; when the lock status of the database item includes a lock owned by a low-priority transaction and the injection status is not-injected status: changing the injection status of the database item to injected status; copying current content of the database item to an undo buffer of the low-priority transaction; and writing into a storage engine of the database item.

According to a third aspect of the present disclosure, there is provided a computer program with a program code for performing a method according to the second aspect, when the computer program runs on a computer.

Optionally, in a further implementation form of the first, the second and/or the third aspects of the disclosure, the high-priority transaction is a single action transaction, including only the request.

Optionally, in a further implementation form of the first, the second and/or the third aspects of the disclosure and any of the previous implementations, the processor is further adapted to: when the lock status of the database item includes a lock owned by a low-priority transaction and the injection status is injected status: write into a storage engine of the database item.

When a lock is injected, it means that the data in the storage engine of the database item is already updated by another high-priority transaction, so it may now be updated again directly.

Optionally, in a further implementation form of the first, the second and/or the third aspects of the disclosure and any of the previous implementations, the processor is further adapted to: receive from a client module a request to read from a database item as part of a high-priority transaction; check a lock status and an injection status of the database item; when the lock status of the database item includes an exclusive lock owned by a low-priority transaction and the injection status is not-injected status: read from an undo buffer of the low-priority transaction.

When an exclusive lock is not injected, the low-priority transaction may be writing in the storage engine, and the undo buffer keeps the old value for the item in case that the transaction rolls back the changes.

More optionally, in a further implementation form of the first, the second and/or the third aspects of the disclosure and any of the previous implementations, the processor is further adapted to: when the lock status of the database item includes a shared lock owned by a low-priority transaction and the injection status is not-injected status: read from a storage engine of the database item.

When a shared lock is not injected, the low priority transaction processes a read request on a data item that has not been modified concurrently by a high priority transaction. Since no changes are made, the storage engine may be used.

More optionally, in a further implementation form of the first, the second and/or the third aspects of the disclosure and any of the previous implementations, the processor is further adapted to: when the lock status of the database item includes a lock owned by a low-priority transaction and the injection status is injected status: read from a storage engine of the database item.

When a lock is injected, it means that the data in the storage engine of the database item is already updated by a previous high-priority transaction, so the storage engine contains the most updated version of the data.

Optionally, in a further implementation form of the first, the second and/or the third aspects of the disclosure and any of the previous implementations, the processor is further adapted to: receive from a client module a request to write into a database item as part of a low-priority transaction; check a lock status and an injection status of the database item; when the lock status of the database item includes a shared lock owned by the low-priority transaction and the injection status is injected status: change the shared lock to an exclusive lock; and write into an undo buffer of the low-priority transaction.

When a lock is injected, it means that the data in the storage engine of the database item is already updated by a high-priority transaction. The low-priority transaction does not apply further changes to the object in the SE in case of commit or rollback. Instead, the undo buffer is used to store a private copy of the object for the transaction.

More optionally, in a further implementation form of the first, the second and/or the third aspects of the disclosure and any of the previous implementations, the processor is further adapted to: when the lock status of the database item includes an exclusive lock owned by the low-priority transaction and the injection status is injected status: write into an undo buffer of the low-priority transaction.

Optionally, in a further implementation form of the first, the second and/or the third aspects of the disclosure and any of the previous implementations, the processor is further adapted to: receive from a client module a request to read from a database item as part of a low-priority transaction; check a lock status and an injection status of the database item; when the lock status of the database item includes a lock owned by the low-priority transaction and the injection status is injected status: read from an undo buffer of the low-priority transaction.

When a lock is injected, it means that the data in the storage engine of the database item is already updated by a high-priority transaction. Therefore, the undo buffer of the low-priority transaction is used.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how exemplary embodiments of the invention may be practiced.

In the drawings.

DETAILED DESCRIPTION

Figure 1:
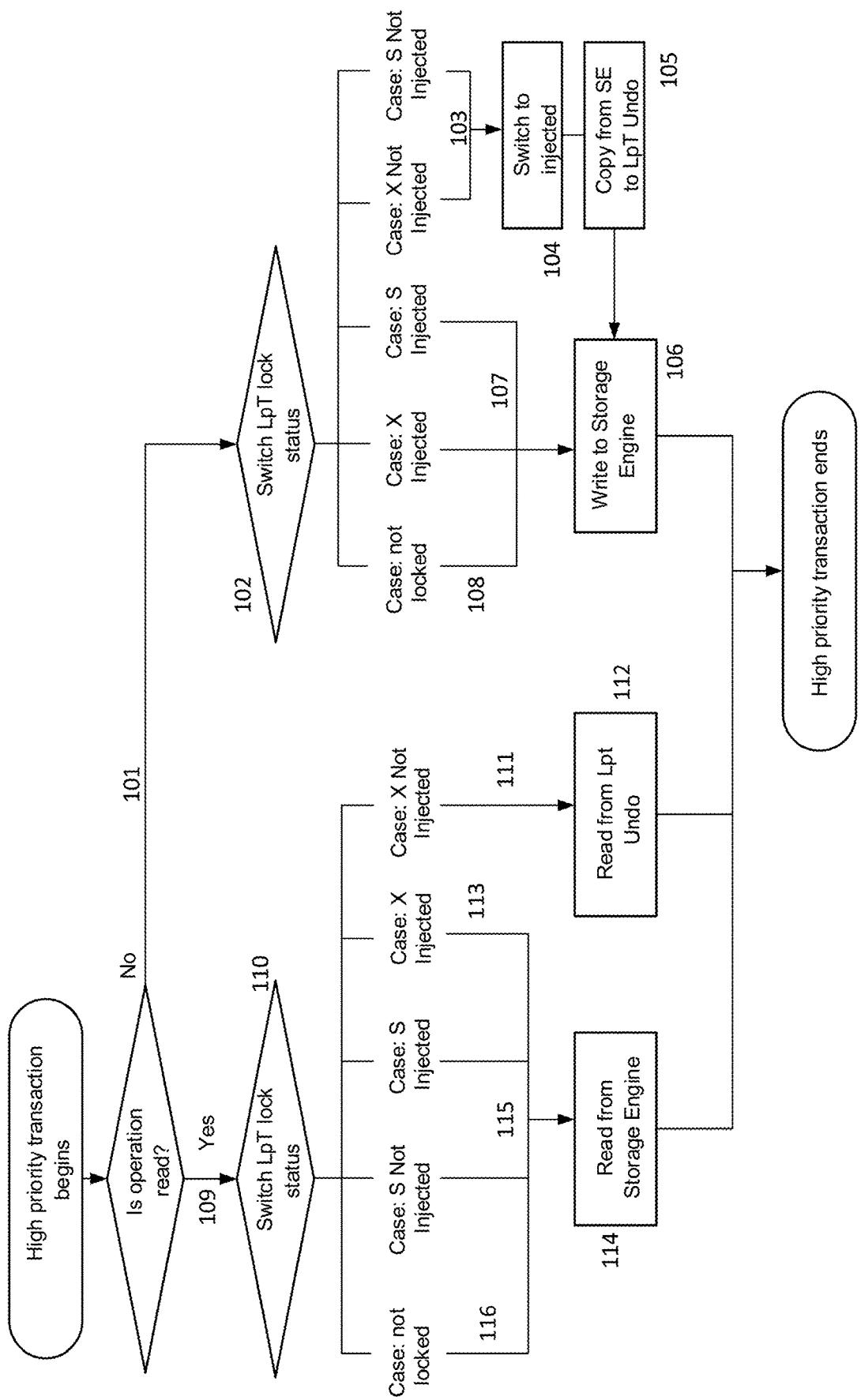
FIG. 1 is a flowchart schematically representing a method of controlling high priority transactions (HpTs) in a database management system, according to some embodiments of the present disclosure.

The present disclosure, in some embodiments thereof, relates to prioritizing database transactions and, more particularly, but not exclusively, to simultaneously executing conflicting transactions by managing lock status.

The present disclosure, in some embodiments thereof, relates to a database system that is implemented with lock based concurrency control technique. According to some embodiments of the present disclosure, the concurrency control technique increases transaction concurrency by allowing some transactions to run concurrently even when they conflict on the same objects, while guaranteeing atomicity, consistency, isolation and durability (ACID) properties. Prioritized transactions have preference over other transactions, but do not force them to abort.

As in currently implemented concurrency control techniques, two standard types of locks are implemented: Shared lock (S), acquired when a transaction reads an object; and Exclusive lock (X), acquired when a transaction writes an object (also referred to as item). A shared lock may be promoted to an exclusive lock. As in a standard S/X policy, Shared locks are compatible with other shared locks, but not with exclusive locks, while Exclusive locks are not compatible with either shared or exclusive locks.

In currently existing systems, independently of the locking policy, transactions are mutually harming each other when they conflict on an object. For example, with WAIT policy transactions may be blocked, and with NOWAIT policy they may be aborted. WAIT-IF policies may implement priorities, but low priority transactions are aborted when in a conflict.

For the purpose of embodiments of the present disclosure, two types of transactions are defined: Low priority transactions (LpTs) and High priority single operation transactions (HpTs). LpTs may affect an arbitrary number of objects, may be committed or rolled back by the client, and are a sequence of operations, which may have control statements such as conditional statements or loops. HpTs affect only one object and have only one operation —allowed operations for HpT are Read object and Write object. HpT are executed in auto commit mode, (i.e. no rollback allowed by the application, however an HpT can fail (abort) on an internal error).

According to some embodiments of the present disclosure, there is provided an injection state for each lock. The lock may be in non-injected state or in injected state. When a lock is in non-injected state, the transactional behavior is normal, as in existing systems. When a HpT tries to write to an object locked by a LpT, the HpT sets a flag in the lock to mark it as injected, copies current content of the object to the LpT's undo buffer, and writes its changes to the database storage engine (SE). When a LpT tries to access an object, it uses its undo buffer to read or write, instead of the SE.

This presents anew non-blocking method where a HpT can apply its operation even when a LpT holds a lock. The HpT neither waits for the lock taken by the LpT nor aborts the LpT. The method according to the present disclosure improves concurrency by saving some transactions that would be aborted in other methods, using only the undo buffer and the SE (no multiversioning for objects is required). HpT may always proceed when a lock is taken by a LpT (read and write transactions are supported), and never aborts a LpT.

Also, in existing systems, short lived HpT suffer from potentially long-live LpT keeping locks on objects for a longer time. Benefits of the method according to the present disclosure are more significant in a distributed transaction, where LpT may hold a lock for a long time and HpT are expected to have low latency.

Another benefit of the method according to the present disclosure is minimizing deadlocks. HpT do not produce deadlocks because they do not acquire locks. When a LpT is read only, it never deadlocks. When a LpT may write an object, it may acquire an exclusive lock on first access, because this prevents any transaction deadlock.

Before explaining at least one exemplary embodiment of the present invention in detail, it is to be understood that the embodiments of the invention are not necessarily limited in their application to the details of construction and the arrangement of the components and/or methods set forth in the following description and/or illustrated in the drawings and/or the Examples.

The embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
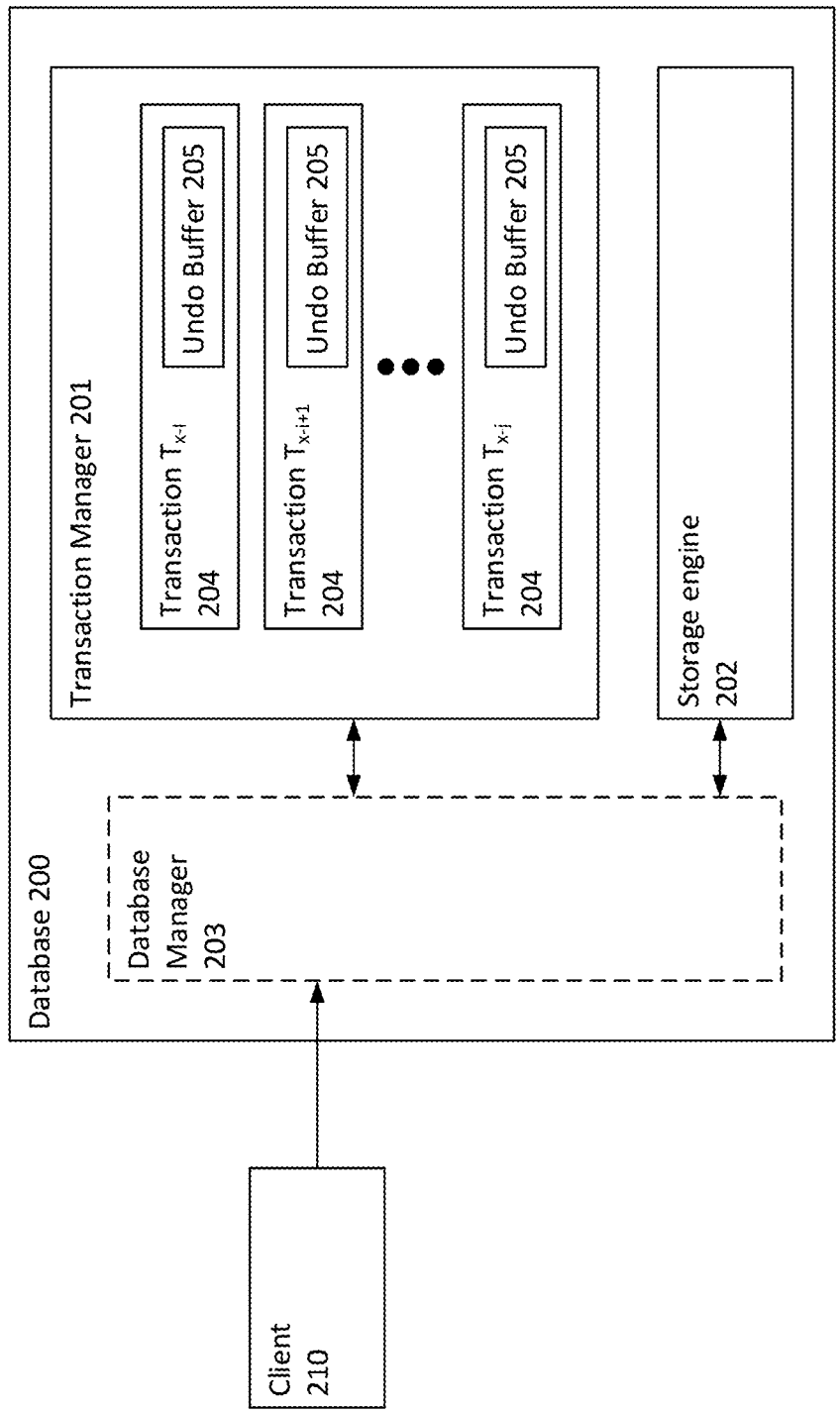
FIG. 2 is a schematic illustration of a database management system for controlling prioritized transactions, according to some embodiments of the present disclosure.

Referring now to the drawings, FIG. 1 is a flowchart schematically representing a method of controlling HpTs in a database management system, according to some embodiments of the present disclosure. Reference is also made to FIG. 2, which is a schematic illustration of a database management system for controlling prioritized transactions, according to some embodiments of the present disclosure.

Requests are received from a client 210, as transactions, to read and/or write in a database 200. Database 200 may be a relational database or a non-relational database. Database 200 includes a transaction manager 201, which registers transactions 204 and executes them. Each transaction 204 has an undo buffer 205 to store the original state of the database if the transaction is rolled back or aborted.

Database 200 also includes a storage engine 202, which stores the data items of database 200. Optionally, database 200 also includes a database manager 203, which receives the transaction requests from client 210 and registers them into transaction manager 201.

Database 200 may be included in any type of computer and/or computer system, which may include one or more computing devices, for example, a mainframe computer, an enterprise server, a workstation, multiple connected computers, one or more virtual machines and/or a personal computer. Client 210 may be located in a separate computer, for example a remote computing device connected to database 200 via a network. Client 210 may also be included in the same computer and/or computer system as database 200, for example a software module such as an application and/or an operating system.

Actions of the method may be performed by a processor and instructions to perform the actions may be implemented in transaction manager 201, a transactional storage engine and/or any other component that implements the transaction logic.

In a transactional database, the method may be implemented for example on row level, on page level or on table level or any similar data granularity. Also, it could be implemented on a combination of multiple levels. This may also be implemented in a non-relational database, for example where an object has a unique identifier, like keys in a key/value, document identifiers in a document-oriented database, or vertex/edge identifiers in a graph model.

Optionally, storage engine 202 provides no specific transactional support. Therefore, it may be assumed that: storage engine 202 stores a single version of an item; write operations apply the changes immediately to storage engine 202 unless specified otherwise; write operations are atomic and isolated, meaning only the results of completed writes are exposed at any time; read operations return items being in a consistent state (representing a point in a transaction history); and/or transactions store a copy of the old version of the item, which is applied for rollback of the changes.

Optionally, for LpT, it is not needed to declare all operations at the beginning of the LpT transaction; it is possible to add more operations. It may also be assumed that LpTs use a state of the art two phase locking policy for lock acquisition, and/or that database 200 includes a standard deadlock detection or prevention mechanism to avoid deadlocks.

Optionally, a single operation for a HpT may be applied atomically and in isolation from others. This may be achieved, for example, by known methods such as: a mutex that is acquired and released on each access to the object. Both HpTs and LpTs acquire the lock in each access; a cooperative multitask engine based on light weight threads, where a light weight thread does not yield to others until it completes the operation; an algorithm based on atomic primitives given by the processor; and/or a transactional memory implementation.

First, as shown at 101, a request is received from a client module to write into a database item as part of a HpT.

Then, as shown at 102, the lock status and the injection status of the item are checked.

When the lock status of the item includes a lock owned by a LpT and the injection status is not-injected status, as shown at 103 (when the lock is S-not injected or X-not injected), the following is performed:

First, as shown at 104, the injection status of the item is changed to injected status.

Then, as shown at 105, the current content of the item is copied to the undo buffer 205 of the LpT.

Finally, as shown at 106, the change to the item is written into storage engine 202.

Below is an exemplary HpT transaction executed while a LpT is concurrently executed. Each row indicates the operation applied by the processor. Time advances from top to bottom.

| Time | Tx-A (LpT) | HpT Write |
|---|---|---|
| 1 | X-Lock (Obj1) | |
| 2 | Write (Obj1, 'A') | |
| 3 | | Write (Obj1, 'B') |
| 4 | 'A' <= Read(Obj1) | |
| 5 | X-Lock (Obj2) | |
| 6 | Write (Obj2, 'A') | |
| 7 | Commit | |

In the final state Obj1='B', Obj2='A', both HpT and LpT commit. By comparison, in a similar situation executed with known methods, HpT waits (in WAIT) or HpT aborts (in NO WAIT).

Optionally, when the lock status of the item includes a lock owned by a LpT and the injection status is injected status, as shown at 107 (when the lock is S-injected or X-injected), the change to the item is directly written into storage engine 202, as shown at 106. Optionally, this is also done when the lock status of the item does not include a lock, as shown at 108 (case: not locked).

Optionally, when a request is received from a client module to read from a database item as part of a HpT, as shown at 109, the lock status and the injection status of the item are checked as shown at 110.

Then, optionally, when the lock status of the item includes an exclusive lock owned by a LpT and the injection status is not-injected status, as shown at 111 (when the lock is X-not injected), the data is read from the undo buffer 205 of the LpT, as shown at 112.

Optionally, when the lock status of the item includes an exclusive lock owned by a LpT and the injection status is injected status, as shown at 113 (when the lock is X-injected), the data of the item is read from storage engine 202, as shown at 114. Optionally, this is also done when the lock status of the item includes a shared lock owned by a LpT, as shown at 115 (when the lock is S-not injected or S-injected). Optionally, this is also done when the lock status of the item does not include a lock, as shown at 116 (case: not locked).

Figure 3:
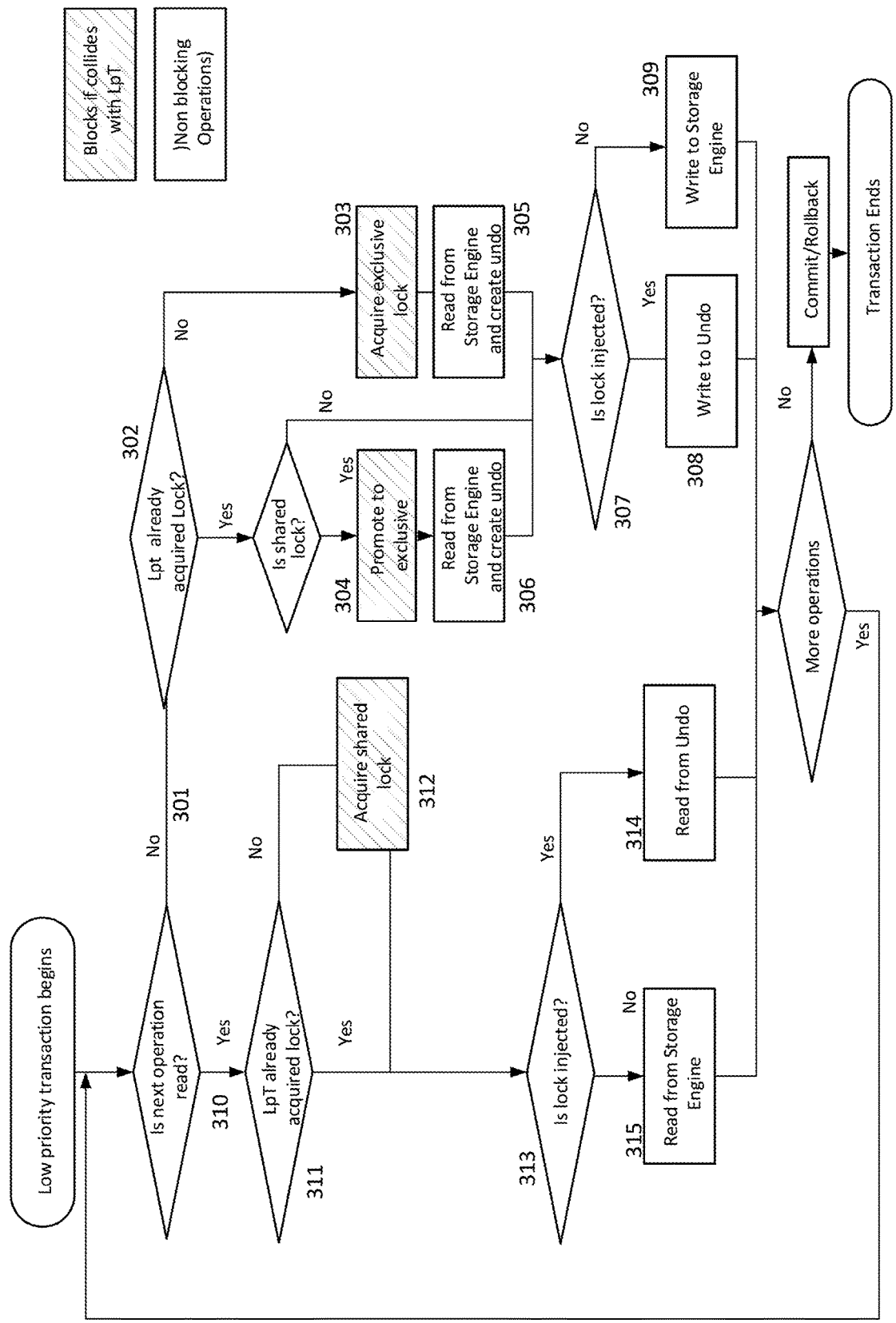
FIG. 3 is a flowchart schematically representing a method of controlling low priority transactions (LpTs) in a database management system, according to some embodiments of the present disclosure.

Reference is now made to FIG. 3, which is a flowchart schematically representing a method of controlling LpTs in a database management system, according to some embodiments of the present disclosure. When the injection status is not-injected status, LpT may be handled the same way as in known methods.

Optionally, when a request is received from a client module to write into a database item as part of a LpT, as shown at 301, the lock status is checked as shown at 302. Optionally, when the lock status of the item does not include a lock, an exclusive lock is acquired, as shown at 303. Optionally, when the lock status of the item includes a shared lock owned by the LpT the shared lock is changed to an exclusive lock, as shown at 304. Optionally, when the lock status of the item includes a lock owned by another transaction, the LpT waits.

Optionally, then, as shown at 305 and 306, an undo buffer is created for the LpT and the current content of the item is copied to the undo buffer of the LpT.

Optionally, then, as shown at 307, the injection status of the item is checked. Optionally, when the injection status of the item is injected status, the change to the item is written into the undo buffer of the LpT, as shown at 308 (lock X-injected). Optionally, when the injection status of the item is not-injected status, the change to the item is directly written into storage engine 202, as shown at 309. After a HpT write, the status is injected, and the LpT does not apply further changes to the object in the SE in case of commit or rollback. Instead, the undo buffer is used to store a private copy of the object for the transaction.

Optionally, when a request is received from a client module to read from a database item as part of a LpT, as shown at 310, the lock status is checked as shown at 311. Optionally, when the lock status of the item does not include a lock or includes a shared lock by another transaction, a shared lock is acquired, as shown at 312. Optionally, when the lock status of the item includes an exclusive lock owned by another transaction, the LpT waits.

Optionally, then, as shown at 313, the injection status of the item is checked. Optionally, when the injection status of the item is injected status, the item is read from the undo buffer of the LpT, as shown at 314 (lock X-injected or S-injected). Optionally, when the injection status of the item is not-injected status, the item is directly read from the storage engine 202, as shown at 315. When a lock is injected, it means that the data in the storage engine of the database item is already updated by a high-priority transaction. Therefore, the undo buffer of the low-priority transaction is used.

The application of the rules as described above, provides the following serialization order for concurrent HpT and LpT:

Write HpTs are always serialized after LpTs.
Read HpTs on an injected lock are always serialized after LpTs.
Read HpTs on a non-injected lock are always serialized before LpTs.

Figure 4:
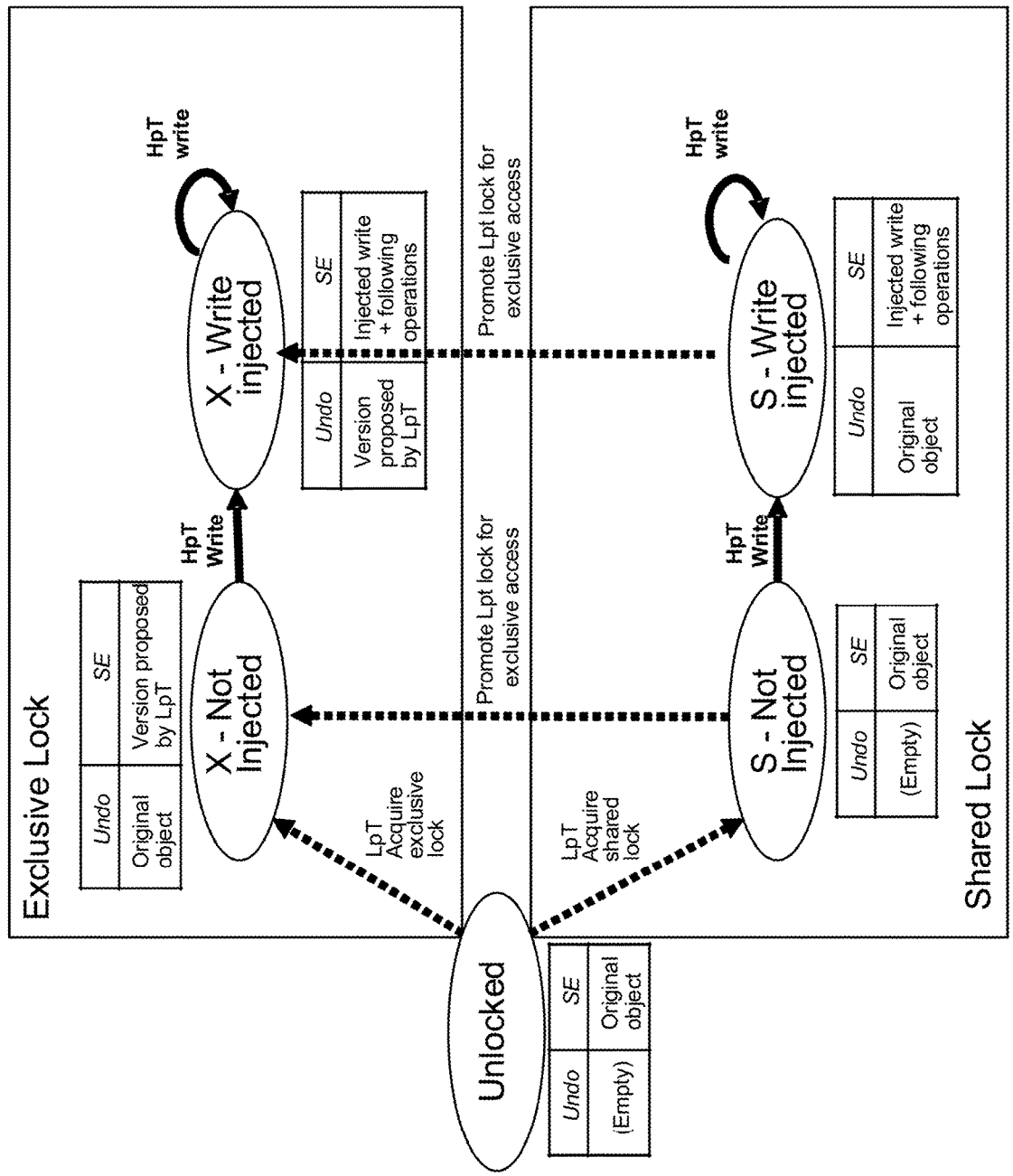
FIG. 4 is a state diagram schematically representing the database locks in a database management system, according to some embodiments of the present disclosure.

Reference is now made to FIG. 4, which is a state diagram schematically representing the database locks in a database management system, according to some embodiments of the present disclosure. The diagram shows, for each lock status and injection status, the content of the storage engine and the content of the undo buffer, according to the method as described above. The diagram also shows changes in status that are made by the actions described above.

Figure 5B:
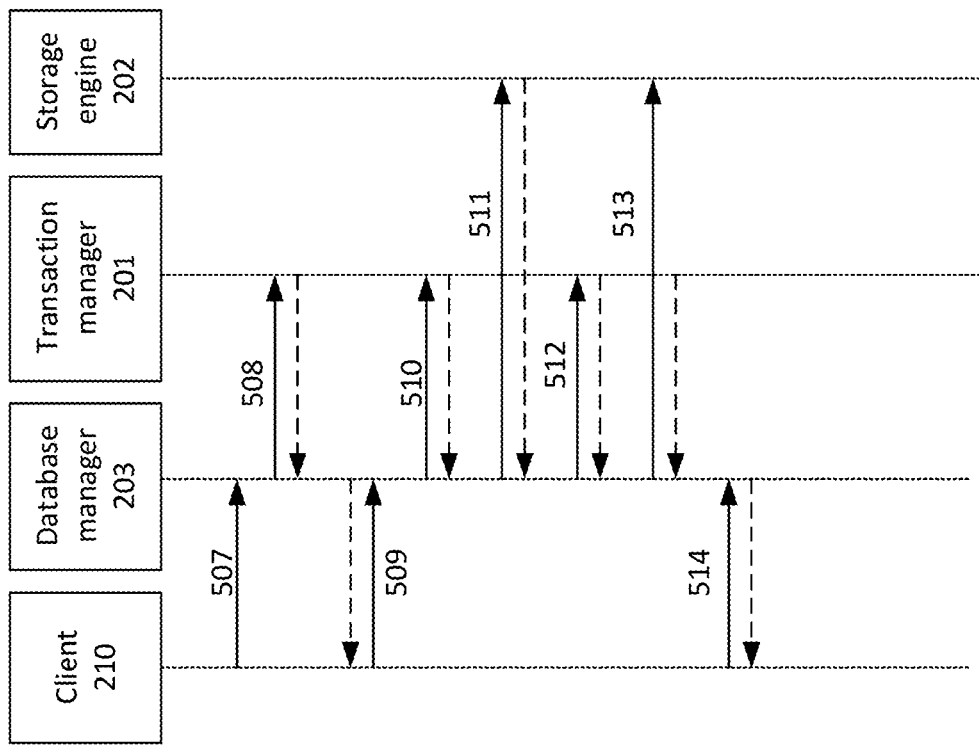
FIGS. 5A and 5B are sequence diagrams schematically representing the actions made for a read and write transactions, respectively, according to some embodiments of the present disclosure.
Figure 5A:
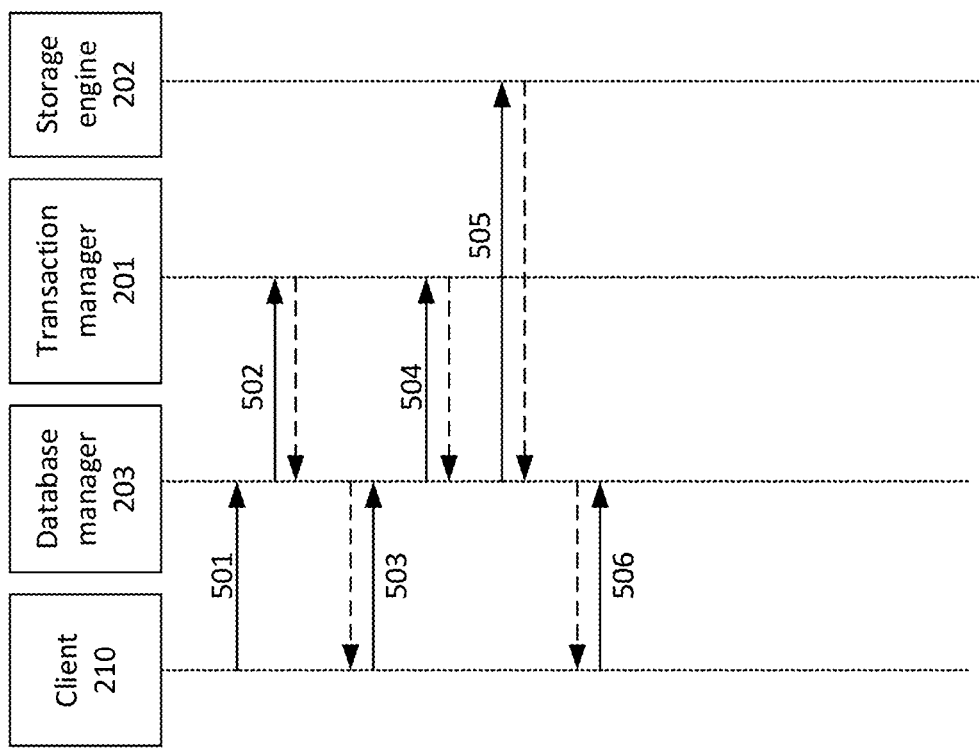

Reference is now made to FIGS. 5A and 5B, which are sequence diagrams schematically representing the actions made for a read and write transactions, respectively, according to some embodiments of the present disclosure.

In FIG. 5A, client 210 begins a transaction (501); then database manager 203 registers the transaction and its priority into transaction manager 201 (502); client 210 issues read requests (503); transaction manager 201 grants access according to HpT and LpT policies (504); database manager 203 provides the data (505); and finally client 210 commits or rolls back the transaction (506).

In FIG. 5B, after the transaction begins (507) and is registered (508), client 210 issues write requests (509); transaction manager 201 grants access according to HpT and LpT policies (510); database manager 203 reads and stores old versions of the modified objects in undo buffers 205 (511 and 512); database manager 203 writes the object in storage engine 202 (513); and finally client 210 commits or rolls back the transaction (514).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant database systems will be developed and the scope of the term database is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments of the invention, which are, for clarity, described in the context of separate embodiments, may also be provided in combination in a single embodiment. Conversely, various features of an embodiment of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A database management system for controlling prioritized transactions, the database management system comprising:
    a processor adapted to:
        receive, from a client module, a request to write into a database item as part of a high-priority transaction;
        check a lock status and an injection status of the database item; and
        based upon determining that the lock status of the database item comprises a lock owned by a low-priority transaction and the injection status is not-injected:
            change the injection status of the database item to injected;
            copy current content of the database item to an undo buffer of the low-priority transaction; and
            write into a storage engine of the database item according to the request as part of the high-priority transaction while the lock status of the database item comprises the lock owned by the low-priority transaction.

2. The database management system according to claim 1, wherein the high-priority transaction is a single action transaction, comprising only the request.

3. The database management system according to claim 1, wherein the processor is further adapted to:
    based upon determining that the lock status of the database item comprises the lock owned by the low-priority transaction and the injection status is injected:
        write into the storage engine of the database item.

4. The database management system according to claim 1, wherein the processor is further adapted to:
    receive, from the client module, a request to read from the database item as part of the high-priority transaction;
    check the lock status and the injection status of the database item; and
    based upon determining that the lock status of the database item comprises an exclusive lock owned by the low-priority transaction and the injection status is not-injected:
        read from the undo buffer of the low-priority transaction.

5. The database management system according to claim 4, wherein the processor is further adapted to:
    based upon determining that the lock status of the database item comprises a shared lock owned by the low-priority transaction and the injection status is not-injected:
        read from the storage engine of the database item.

6. The database management system according to claim 4, wherein the processor is further adapted to:
    based upon determining that the lock status of the database item comprises the lock owned by the low-priority transaction and the injection status is injected:
        read from the storage engine of the database item.

7. The database management system according to claim 1, wherein the processor is further adapted to:
    receive, from the client module, a request to write into the database item as part of the low-priority transaction;
    check the lock status and the injection status of the database item; and
    based upon determining that the lock status of the database item comprises a shared lock owned by the low-priority transaction and the injection status is injected:
        change the shared lock to an exclusive lock; and
        write into the undo buffer of the low-priority transaction.

8. The database management system according to claim 7, wherein the processor is further adapted to:
    based upon determining that the lock status of the database item comprises an exclusive lock owned by the low-priority transaction and the injection status is injected:
        write into the undo buffer of the low-priority transaction.

9. The database management system according to claim 1, wherein the processor is further adapted to:
    receive, from the client module, a request to read from the database item as part of the low-priority transaction;
    check the lock status and the injection status of the database item; and
    based upon determining that the lock status of the database item comprises the lock owned by the low-priority transaction and the injection status is injected:
        read from the undo buffer of the low-priority transaction.

10. A computer implemented method of controlling prioritized transactions in a database management system, the method comprising:
    receiving, from a client module, a request to write into a database item as part of a high-priority transaction;
    checking a lock status and an injection status of the database item; and
    based upon determining that the lock status of the database item comprises a lock owned by a low-priority transaction and the injection status is not-injected:
        changing the injection status of the database item to injected;
        copying current content of the database item to an undo buffer of the low-priority transaction; and
        writing into a storage engine of the database item according to the request as part of the high-priority transaction while the lock status of the database item comprises the lock owned by the low-priority transaction.

11. A non-transitory computer readable medium comprising a program code for performing the method according to claim 10, when the program code runs on a computer.

12. The database management system according to claim 1, wherein the processor is adapted to:
retain exclusive ownership of the lock with the low-priority transaction until a commit or a roll back of the high-priority transaction.

13. The database management system according to claim 1, wherein the processor is configured to:
receive, from the client module, a second request to read or write into the database item as part of the low-priority transaction, and
read or write from the undo buffer of the low-priority transaction according to the second request as part of the low-priority transaction until a commit or roll back occurs of either the high-priority transaction or the low-priority transactions,
upon a change of the high-priority transaction being made to the storage engine of the database item and the injection status of the database item being changed to injected.

14. The database management system according to claim 1, wherein the processor is configured to:
receive, from the client module, a request to read or write into the database item as part of a subsequent low-priority transaction, and
read or write from the undo buffer of the low-priority transaction according to the request as part of the subsequent low-priority transaction until a commit or roll back occurs of either the high-priority transaction or the low-priority transactions,
upon a change of the high-priority transaction being made to the storage engine of the database item and the injection status of the database item being changed to injected.

15. The method according to claim 10, wherein writing into the storage engine of the database item as part of the high priority transaction is performed concurrently with reading or writing from the undo buffer of the low-priority transaction according to a request to read or write from the undo buffer as part of the low-priority transaction.

16. The method according to claim 1, wherein writing into the storage engine of the database item as part of the high priority transaction is performed concurrently with reading or writing from the undo buffer of the low-priority transaction according to a request to read or write from the undo buffer as part of the low-priority transaction.

\* \* \* \* \*